US008405879B2

(12) United States Patent
Boness et al.

(10) Patent No.: US 8,405,879 B2
(45) Date of Patent: Mar. 26, 2013

(54) METHOD FOR CALIBRATING A MULTI-COLOR PRINTING MACHINE

(75) Inventors: Jan D. Boness, Bad Bramstedt (DE); Ingo K. Dreher, Kiel (DE); Heiko Hunold, Wattenbeck (DE); Frank Pierel, Gettorf (DE); Stefan Schrader, Kiel (DE); Matthias Wecker, Bebra-Asmushausen (DE)

(73) Assignee: Eastman Kodak Company, Rochester, NY (US)

( * ) Notice: Subject to any disclaimer, the term of this patent is extended or adjusted under 35 U.S.C. 154(b) by 348 days.

(21) Appl. No.: 12/675,182

(22) PCT Filed: Aug. 7, 2008

(86) PCT No.: PCT/EP2008/060419

§ 371 (c)(1), (2), (4) Date: Nov. 22, 2010

(87) PCT Pub. No.: WO2009/027199

PCT Pub. Date: Mar. 5, 2009

(65) Prior Publication Data

US 2011/0063634 A1 Mar. 17, 2011

(30) Foreign Application Priority Data

Aug. 31, 2007 (DE) ......................... 10 2007 041 393

(51) Int. Cl.

*H04N 1/58* (2006.01)
*G06K 15/14* (2006.01)
*G03G 15/01* (2006.01)
*B41J 2/525* (2006.01)

(52) U.S. Cl. ....... 358/3.26; 358/504; 358/540; 347/116; 399/49; 399/72; 399/300; 399/301

(58) Field of Classification Search .................. 358/1.7, 358/1.9, 3.24, 3, 26, 504, 518, 540, 300; 347/115, 116, 232, 234, 235, 248; 399/38, 399/49, 72, 299, 300, 301, 302; 382/162

See application file for complete search history.

(56) References Cited

U.S. PATENT DOCUMENTS 7,035,557 B2 * 4/2006 Boness et al. .................. 399/38
7,333,758 B2 * 2/2008 Munakata et al. ............ 399/299

(Continued)

FOREIGN PATENT DOCUMENTS

DE 103 20 064 9/2004
EP 0 909 646 4/1999

*Primary Examiner* — Scott A Rogers
(74) *Attorney, Agent, or Firm* — Raymond L. Owens

(57) ABSTRACT

A method for calibrating a position of a first register line in a register mark for a multi-color printing machine, said first register line consisting of a first color that does not offer sufficient contrast with respect to a printing material to allow detection above a determined threshold on a register sensor. A plurality of register marks, each consisting of at least one starting line, a background line and a first register line, is printed, said background line consisting of a second color which offers sufficient contrast with respect to the first color for detection above the specified threshold on the register sensor if the first register line is printed on the background line, and said background line having a width that is greater than the first register line, and said starting line, said background line and said first register line being printed with the use of the pre-determined control parameters, which normally cause the first register line to be printed on the background line. Subsequently, it is detected whether the first register line has been recognized by the register sensor above the predetermined threshold as being completely positioned on the background line. If not, then at least one predetermined control parameter for printing the first register line is changed and printing of the register marks and the detection are repeated. Changing of the at least one control parameter may be repeated one or more times, with the first register line being shifted each time with respect to its width.

10 Claims, 3 Drawing Sheets

U.S. PATENT DOCUMENTS

| | | | | |
|---|---|---|---|---|
| 7,630,100 | B2 * | 12/2009 | Tojima et al. | 358/3.26 |
| 8,059,978 | B2 * | 11/2011 | Mizushima et al. | 399/45 |
| 8,068,259 | B2 * | 11/2011 | Tojima et al. | 358/3.26 |
| 2004/0109160 | A1 | 6/2004 | Luxem et al. | |
| 2006/0222419 | A1 | 10/2006 | Ishibashi et al. | |
| 2011/0063643 | A1 * | 3/2011 | Boness et al. | 358/1.9 |

* cited by examiner

METHOD FOR CALIBRATING A MULTI-COLOR PRINTING MACHINE

TECHNICAL FIELD OF THE INVENTION

The present invention relates to a method for calibrating a multi-color printing machine. In particular, the present invention relates to a method for calibrating a position of a first register line in a register mark for a multi-color printing machine, said first register line consisting of a first color that does not offer sufficient contrast with respect to a printing material in order to allow a detection above a determined threshold value on a register sensor.

BACKGROUND ART

In multi-color printing technology it has been generally known to regularly calibrate the printing units for the individual color separations, so that printing of the individual color separations in good register is ensured. For example, various calibrating methods for a multi-color printing machine have been known from the Applicant's document DE 101 39 310 A. Such a basic calibration, which is used to calibrate the length tolerances of the printing machine in the region of the printing units is a requirement to allow the machine to subsequently print in register. During this basic calibration, the "exposure timing", i.e., the time-related enabling of the writing devices of the printing units of the printing machine is set. The objective of the entire calibration is to measure registration errors caused by length tolerances of the machine (distances of the printing units), tolerances of photoconductor rollers (imaging drums) and of rubber-sheet cylinders (intermediate drums) and by the transport belt itself, and to store said errors for future printing operations and pilot-actuation.

For such a known calibration method, as a rule, a plurality of register marks composed of individual, spaced apart lines of the individual colors are printed. The distances between the individual lines are determined by a register sensor that is arranged downstream of the printing units. To do so, the register sensor measures light/dark and dark/light transitions between the individual register lines and the printing material underneath, said printing material usually being a transparent transport belt that is disposed to transport the sheets to be printed through the printing units. When detecting the individual register lines of the register marks, the register sensor requires that sufficient light/dark or dark/light contrasts be provided between the printing material (in this case, the transport belt) and the register lines, because the register sensor, as a rule, is adjusted in such a manner that it only detects contrasts above a certain threshold value. Indeed, it would also be possible to lower the threshold value for the contrast, however, this could potentially result in a plurality of erroneous detections that are not caused by register lines.

In multi-color printing machines, the technical problem now arises that, in recent times, special inks are used more and more frequently, such as, for example, a colorless dry toner that is also referred to as clear dry ink (CDI). Those inks may potentially not exhibit a sufficient contrast with respect to the printing material in order to ensure an appropriate detection above the pre-specified threshold value on the register sensor.

In order to solve this technical problem in the past, the register line of the CDI was, for example, printed on a previously printed black background line during the calibration. Now the CDI again exhibited sufficient contrast with respect to this black background line to thus allow a detection above the threshold value of the register sensor. However, in conjunction with this, the problem arose that with large tolerances within the printing machine, it cannot always be ensured that the CDI falls on the printed black background line. Consequently, a proper detection of the CDI register line was not possible, thus leading to an interruption of the entire calibration process. In these cases, customized machine control software versions were issued for such individual machines, which, under normal circumstances, should be strictly avoided.

DISCLOSURE OF THE INVENTION

Therefore, the object of the present invention is to provide a method for calibrating a position of a first register line in a register mark for a multi-color printing machine, said method overcoming one or more of the aforementioned problems.

In accordance with the invention, the present invention provides a method for calibrating a position of a first register line in a register mark for a multi-color printing machine, said first register line consisting of a first color which does not offer sufficient contrast with respect to a printing material in order to allow a detection above a certain threshold value on a register sensor. For this method, first a plurality of register marks, each consisting of a starting line, a background line and a first register line, is printed, said background line consisting of a second color which offers sufficient contrast with respect to the first color for a detection above the specified threshold value on the register sensor when the first register line is printed on the background line, and said background line having a width that is by X mm greater than the first register line, and wherein said starting line, said background line and said first register line being printed with the use of pre-determined control parameters, which, in the normal case, cause the first register line to be printed on the background line. Subsequently, it is detected whether the first register line has been recognized by the register sensor above the pre-determined threshold value as being completely positioned on the background line. If this is not the case, then, at least one pre-determined control parameter for printing the first register line is changed in order to shift the line by +Y mm with respect to the position that has been pre-specified by the control parameter in the direction of its width, and subsequently, again a plurality of register marks of the aforementioned type is printed with the use of the minimum of one changed control parameter for printing the first register line. Thereafter, it is again detected whether the first register line is recognized by the register sensor above the pre-specified threshold value as being completely positioned on the background line. If, again, this is not the case, the minimum of one pre-determined control parameter for printing the first register line is again changed in order to now shift the line by −Y mm with respect to the position pre-specified by the predetermined control parameter in the direction of its width, and, subsequently, again a plurality of first register marks of the aforementioned type is printed with the use of the control parameter that has again been changed. Thereafter, it is again detected whether the first register line is recognized by the register sensor above the pre-specified threshold value as being completely positioned on the background line. If, at this point in time, the first register line has still not been detected on the background line, an appropriate message may be generated and, optionally, additional measures, which will be explained in detail hereinafter, may be initiated. If, at any point in time, the first register line was detected as being completely positioned on the background line, the position of said register line on the background line will be determined, and a changed control parameter will be determined if the deviation from a rated position on the background line is above a specific threshold value, and this changed control parameter is made available for subsequent processes. The aforementioned iterative calibration method permits the automatic performance of several calibration cycles, whereby the control parameters for the first register line are changed each time. This is to achieve that the first register line is printed on the corresponding background line in order to permit a corresponding detection on the register sensor. As soon as an appropriate detection by the register sensor occurs, no additional register marks of this type need to be printed, and the position of the register line on the background line can be directly determined and, if necessary, a changed control parameter can be determined in order to permit good positioning of the first register line during the subsequent printing operations, which, for example, may initially comprise an additional calibration.

Even in the case of large machine tolerances, the aforementioned method allows, when necessary, a successful calibration without requiring the issue of a customized machine control software version and without having to allow an operator to intervene in the calibration cycle. In addition, optionally, a changed control parameter for the first color is determined, said parameter being used in future applications, which, in particular when a renewed calibration of the above type is performed, usually makes multiple iterations unnecessary.

In a particularly preferred embodiment, the background line in the aforementioned method is at least 4 mm wider than the first register line and preferably 7 mm wider than the first register line. Preferably, X and Y are real numbers and the relationship $Y \leqq X/2$ is applicable, for example, when the first register line is located directly at the edge of the background line, for centering said register line during the iteration essentially with respect to the background line. In this case, Y is preferably approximately equal to 3 mm.

In an embodiment of the invention, the above-described steps, by which the control parameters are changed, are repeated at least once for a value of Y, said value being greater than the previously used value, when no successful detection exists on the register sensor. Consequently, it is, if necessary, possible to provide a successful calibration within the machine, even in instances of very large tolerances.

In an embodiment of the invention, the pre-determined control parameter for printing the first register line is an unchangeable default value that is pre-specified by the multicolor printing machine. As a result of this, it is ensured that the calibration process is always started with parameters that cannot be changed by the machine operator. To the extent that the machine operator is given options of changing the control parameters that are used, it may be assumed that erroneous inputs will occur and a calibration will be faulty and must be interrupted.

In an alternative embodiment of the invention, the pre-determined control parameter used for printing the first register line is a control parameter which was determined as a changed parameter during a previous calibration. As a result of this, it may potentially be prevented that the above-described calibration method results in unnecessary iterations. Inasmuch as, however, the pre-specified control parameter is thus changeable, undesirable errors may occur also in this case. Therefore, it is preferably provided that, if a first unsuccessful detection of the register line occurs, the pre-determined control parameter for printing the first register line is reset to a pre-specified unchangeable default value of the printing machine in order to, subsequently, use this default control parameter for printing a plurality of register marks and perform an appropriate detection.

Consequently, it is again possible to ensure that, even when changed control parameters may be used for the first cycle of the calibration process, these parameters can be, in a first step, set to unchangeable pre-specified default control parameters if the calibration is not instantly successful.

In accordance with an embodiment of the invention, the register mark for carrying out the aforementioned method comprises, in addition to the starting line, another register line that is black and acts as a reference point for measuring the circumferential register. Advantageously, the starting line and/or the background line are black because black, as a rule, offers the best contrast with respect to additional colors. However, in individual applications it is also conceivable that the background line, in particular, has a different color that offers a sufficient contrast with respect to the first color for a detection above the pre-specified threshold value.

If, in the above-described calibration method, the first register line was at no time recognized above the pre-specified threshold value as being completely positioned on the background line, a calibration cycle for the density of the first color may be automatically initiated, during which at least one line is printed in the first color, the density of the line is detected, the control parameters for the density of the color are changed when the density deviates from a rated range, and the changed control parameters are made available for subsequent processes. In addition to the problem that the first register line does not fall on the background line, there may also be the problem that the first register line was not printed with sufficient density and thus was not detected over the threshold value as being located on the background line. In order to prevent such a problem from interrupting the calibration of the machine, the density with which the first color is printed is to be checked first. If, within the calibration cycle for the density of the first color, the corresponding control parameter was changed, the previously described calibration method for the position of the first register line may be performed again, because now a successful detection is potentially possible. In an alternative, it is also possible to increase the density of the first color for printing the register line with respect to the default printing density specifically for the above-described calibration method in order to, if need be, provide a sufficiently high contrast with respect to the background line.

In accordance with the invention, a method for calibrating the positions of a plurality of register lines in a register mark for a multi-color printing machine is also provided, each register mark consisting of at least one starting line, a background line, a first register line, as well as at least one second register line, said first register line consisting of a first color, which does not offer a sufficient contrast with respect to a printing material for a detection above a determined threshold value on a register sensor, which, however, when it is printed on the background line, offers a sufficient contrast for a detection above the determined threshold value on the register sensor. In this method, the position of the first register line is calibrated in accordance with the previously described method in a first step and then a plurality of register marks having the above-described plurality of register lines is printed with the use of pre-determined control parameters, the control parameter used for the first register line corresponding to the control parameter determined during the "pre-calibration". Subsequently, the positions of the register lines in the register marks are detected and the respective control parameters for printing the individual register lines are changed in order to achieve the desired positions of the individual register lines within the register marks. These changed control parameters are made available for subsequent processes in order to ensure printing of different color separations in perfect register.

Advantageously, in the last-described register mark, a second register line is provided next to the starting line, said second register line being black and being used as a reference point for the adjustment of the register sensor.

Hereinafter, the invention will be explained in detail based on a preferred embodiment of the invention with reference to the drawings.

BRIEF DESCRIPTION OF THE DRAWINGS

They show in

MODES FOR CARRYING OUT THE INVENTION

Figure 1:
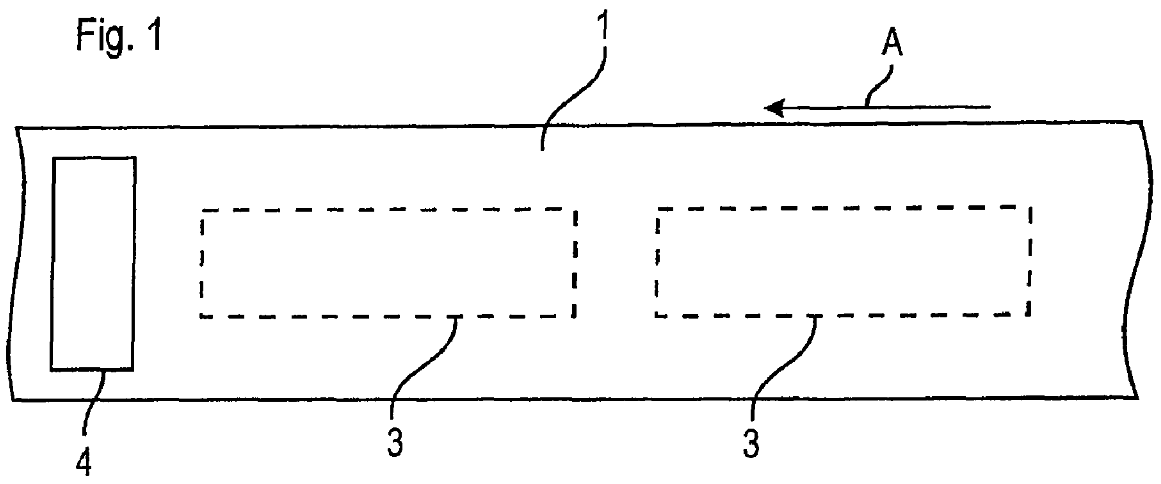
FIG. 1: a schematic plan view of a transport belt of a printing machine with register marks printed on said belt.

FIG. 1 shows a schematic plan view of a section of a transport belt 1 with register marks 3 printed on it, as well as a register sensor 4. In a known manner, the transport belt 1 is arranged so as to rotate (in the direction of the arrow A) in a multi-color printing machine comprising a plurality of printing units that operate electrophotographically, in particular. Viewed in the direction of rotation, the shown transport belt section is downstream of the printing units. Each of the printing units consists, for example, of an imaging drum, a writing device, a toner unit in the vicinity of the imaging drum, and of an intermediate drum. During the printing operation, the writing device applies an electrostatic image to the rotating imaging drum, which image, as it passes the toner unit, receives toner particles consistent with the electrostatic image and subsequently transfers them to the intermediate drum that usually has a rubber surface. The intermediate drum transfers the toner to a printing material that is passed between the intermediate drum and a counter-pressure cylinder. During a normal printing operation, the printing material is usually a sheet, for example, a paper sheet. During a calibration process as described hereinafter, the register marks 3 are directly printed on a transport belt which is normally disposed to pass sheets to be printed through the printing units.

The register marks 3 are printed on the transport belt 1 at a pre-determined distance. Usually the total length of the respective register marks is the same and usually limited to a specific length for technical reasons. As will be explained in detail hereinafter, the register marks 3 consist of individual register lines that are printed on the transport belt 1 by different printing units of the printing machine.

After printing the register marks 3, they are moved past the register sensor 4, which detects the individual lines of the register mark. To do so, the register sensor 4 detects, in a manner known per se, the occurrence of light/dark and dark/light transitions and thus the front and rear edges of the respective register lines of the register marks 3.

Figure 2:
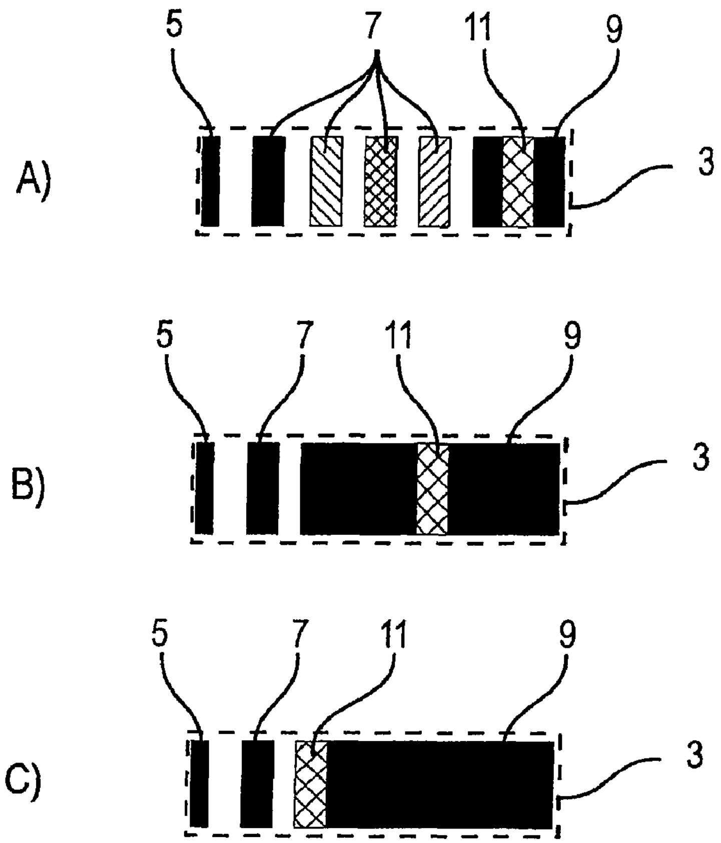
FIG. 2 A-C: a schematic illustration of different register marks.

FIGS. 2 A-C show different register marks 3. FIG. 2 A shows a register mark of a five-color printing machine, said register mark consisting of—viewed in advance direction A of the transport belt 1—a starting line 5 located in front, followed at a distance by normal register lines 7, a background line 9, as well as by a special additional register line 11 that is printed on the background line 9. The starting line 5 is usually black and is disposed to provide the register sensor 4 with a starting point for the detection of a register marks 3. As a rule, the register lines 7 consist of different colors, such as, for example, black, cyan, magenta and yellow, these being each produced by their own printing units. The register line 7 following the starting line 5 is usually black and it is used for measuring the circumferential register, this being used as a reference point for the register sensor 4 during calibration.

The background line 9 is again black and has a substantially greater width compared with the register lines 7 as well as compared with the register line 11. The register line 11 is again printed on the background line 9. The specifically shown register mark having a register line 11 printed on the background line 9 is provided because the register line 11 consists of a color, which, if it were printed directly on the transport belt 1, would not provide a sufficient contrast with respect thereto in order to allow a proper detection by the register sensor 4 above a pre-determined threshold value. If it is printed on the black background line 9, however, a sufficient contrast is provided so that a detection for a calibration of the line positions is possible. FIG. 2 A shows a perfect register mark 3 in which the individual lines 7 and 11 are properly positioned within the register mark 3. However, this need not always be the case, which can result in problems, in particular regarding the register line 11, as described above, when it is not properly printed on the background line 9 and thus does not allow a detection of its position.

In order to ensure proper positioning of the register line 11 on the background line 9, a pre-calibration of the register line 11 is performed in order to calibrate the printing machine before a register mark 3 in accordance with FIG. 2 A is printed. For this pre-calibration, a plurality of simplified register marks 3 in accordance with FIG. 2 B is printed. These register mark consist of a starting line 5, a subsequent register line 7, an expanded background line 9, as well as of a register line 11. FIG. 2 B again shows an ideal register mark in which the respective lines are properly positioned relative to each other. In particular, it can be seen that the register line 11 is printed centered on the expanded background line 9. Overall, it can be seen here that the register mark 3 in accordance with FIG. 2 B has the same total length as the register mark 3 in accordance with FIG. 2 A, this being due to technical reasons. Due to the fact that, in addition to the black starting line 5, only one black register line 7 is used, the background line 9 may be significantly expanded, this substantially increasing the probability that the register line 11 falls thereon. This is referred to as an enlarged capture region of the register line 11 with respect to the background line 9 in accordance with FIG. 2 A.

FIG. 2 C shows a register mark 3 for pre-calibrating the register line 1, said register line 11, however, being printed directly at the front edge of the background line 9. If such a register mark 11 were printed during a pre-calibration, this register mark 11 could not be properly detected by the register sensor 4.

Figure 3:
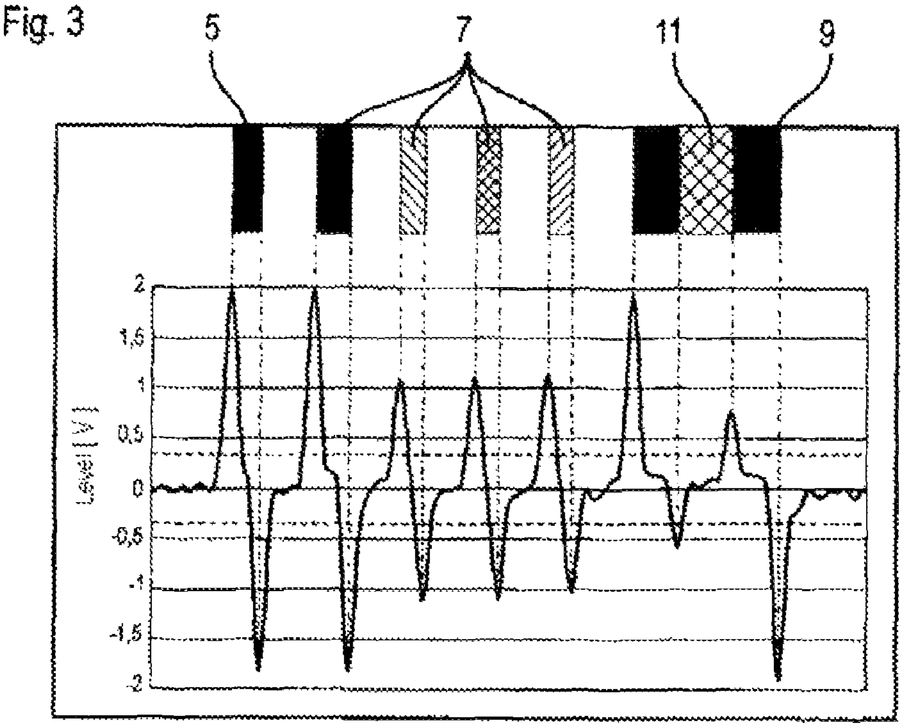
FIG. 3: a schematic illustration of a signal level of a register sensor while a register mark in accordance with FIG. 2 A is being measured.

FIG. 3 shows a schematic view of a signal level of a register sensor 4 during the measurement of a register mark 3 in accordance with FIG. 2 A. The horizontally extending dashed lines in FIG. 3 show the threshold value for a proper detection of the register lines 7. As is obvious from FIG. 3, and as is to be expected, the signal level for the detection of each of the front and rear edges of the black lines 5, 7 is the highest. For the non-black register lines 7, the signal level is substantially lower, and for the register line 11 printed on the background line 9, the signal levels are just above or just below the respective detection threshold values. If the register line 11 were to be printed directly on the transport belt 1, the signals levels for the front or rear edges of the register line 11 would be below the respective threshold value.

Figure 4:
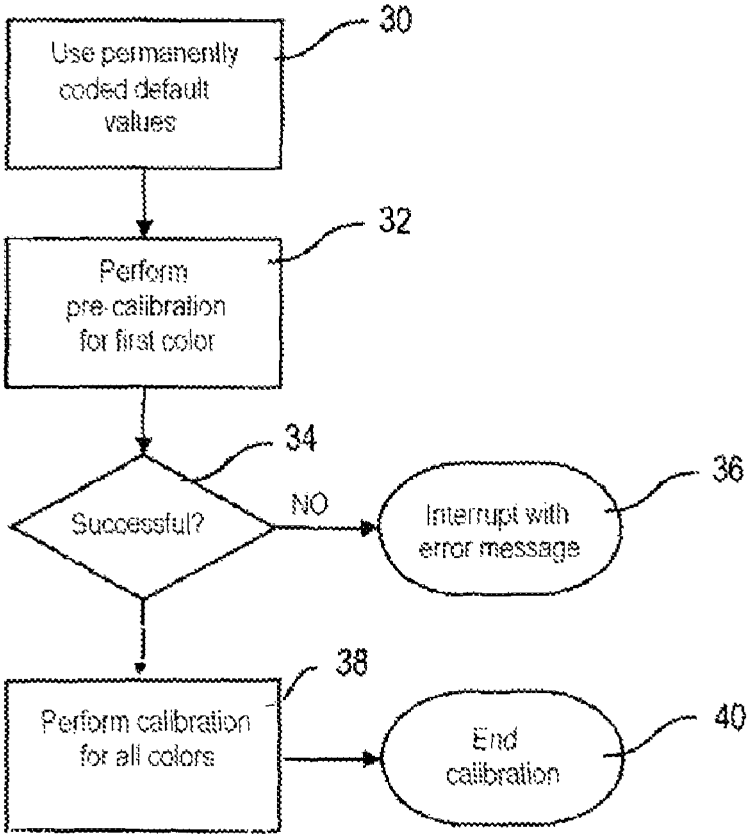
Fig. 4 prior art
FIG. 4: a flow chart illustrating a known process flow of a calibration; and, FIG. 5: a flow chart illustrating a process flow of an iterative calibration in accordance with the present invention.

FIG. 4 shows a flow chart of a known calibration for a multi-color printing machine including a pre-calibration cycle for at least one of the colors in order to position it on a background line 9.

In accordance with this known process flow, the calibration is initialized in block 30, and fixed pre-specified default values for printing register lines 7 are set by the printing machine. Then the process transfers to block 32 in which, in a first step, a pre-calibration for a first color is performed. In particular during this pre-calibration, a plurality of register marks 3 of the type shown in FIG. 2 B, consisting of a starting line, a single register line 7, an expanded background line 9, as well as of a register line 11, is printed. A register sensor 4 then determines whether the register line 11 was properly printed on the background line 9, this taking place in the decision block 34. If the register line 11 was not detected as being located on the background line 9, the calibration process was stopped in block 36 in the past, and a corresponding error message was generated. If, however, the detection was successful, the process control continued to block 38, where the control parameters for the register line were adjusted in such a manner that said register line would fall on the "reduced" background line 9 if a register line in accordance with FIG. 2 A were printed. Subsequently, a calibration was performed for all colors. Finally, the calibration was concluded in block 40.

Figure 5:
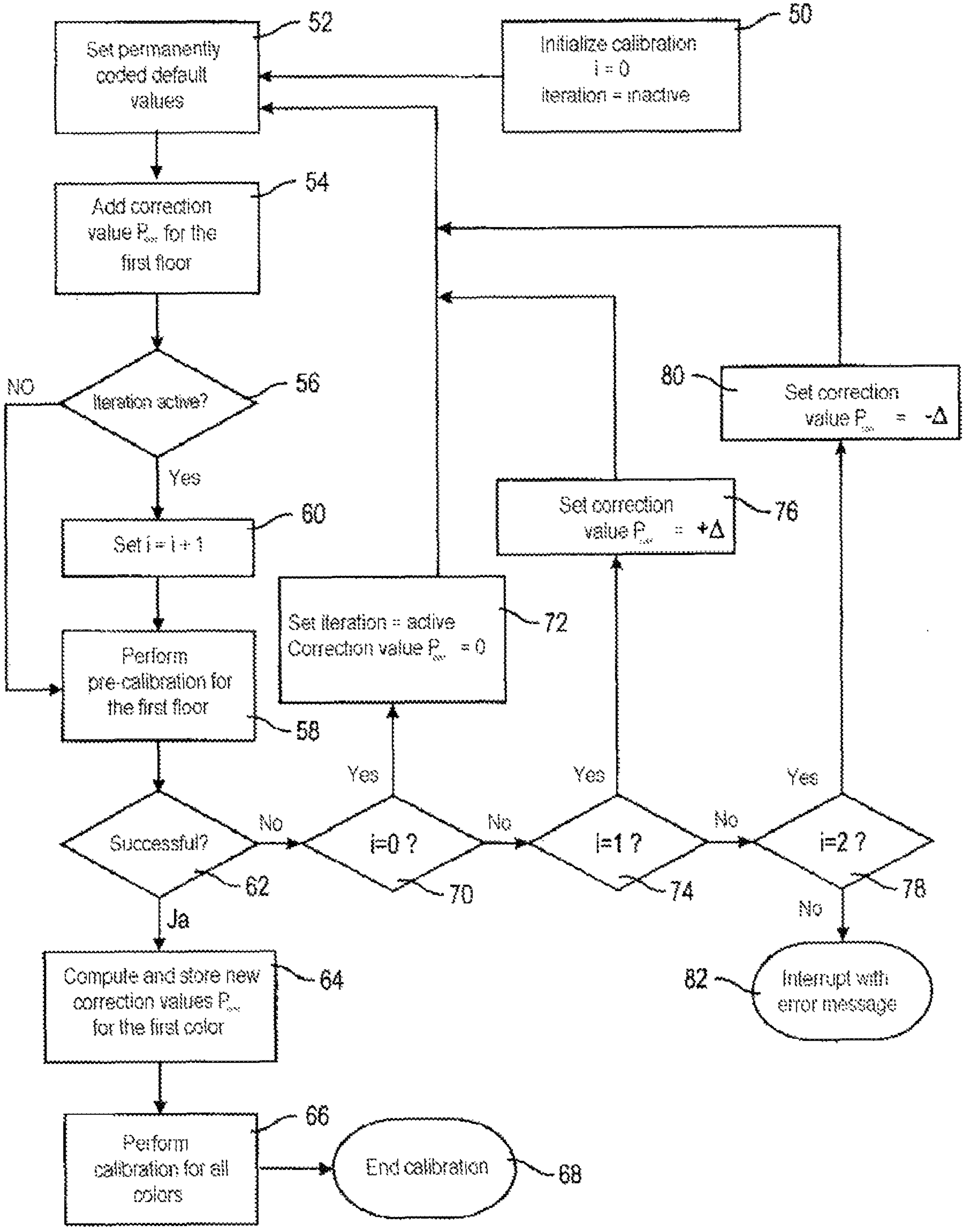

FIG. 5 shows a flow chart for a calibration in accordance with the invention for a multi-color printing machine including an iterative pre-calibration cycle for at least one of the colors, in order to position said color on a background line 9.

The calibration is initialized in block 50, and a value for i is set equal to zero. Here, is indicates the number of iteration cycles. A flag for the iteration cycle will initially be set to inactive.

Then permanently coded default values are set in block 52 as the control parameters for control of the individual printing units. Subsequently, a correction value $P_{corr}$ is added to the control parameter for the printing unit that prints the first color. The correction value may be a determined value which was determined during a previous calibration. However, it is also possible that the correction value is equal to zero, this usually being the case during the first calibration of a printing machine. Further, the correction value may have been reset to zero on the printing machine in case of major maintenance work.

In those cases when the correction value $P_{corr}$ is set equal to zero, it is possible to immediately set the flag for the iteration cycle to active at the time the calibration is initialized. To achieve this, an input test could, if necessary, be performed, whereby the flag for the iteration cycle is set to active instead of inactive whenever the value $P_{corr}$ is equal to zero.

Subsequently, the process control continues with block 56, continues where a determination is made as to whether the flag for the iteration cycle is set to active. If this is not the case—which is usually the case during the first pass of the process—the process control moves on to block 58, where a pre-calibration for the first color is performed in a first step. In particular during this pre-calibration, a plurality of register marks 3 of the type shown in FIG. 2 B consisting of the first color is printed, said register marks 3 consisting of a starting line 5, a single register line 7, an expanded background line 9, as well as of a register line 11. If it was determined in the decision block 56 that the flag for the iteration cycle is set on active, the value of i is increased by one in block 60, before the pre-calibration is performed in block 58.

After printing the plurality of register marks 3, the process control continues with the decision block 62, in which it is determined whether the register line 11 was properly printed on the background line 9. To achieve this, the register marks 3 are moved past a register sensor 4, and it is checked whether the register sensor 4 indicates a pre-determined signal profile.

If it was determined that the register line 11 was properly printed on the background line 9, the process moves on to block 64, in which a new correction value $P_{corr}$ for the first color is first computed and stored. The computation is performed with the detected position of the register line 11 on the background line 9. The new correction value to be computed is related to a deviation from the rated position by the register line 11 on the background line 9. If the process is to be accelerated, it is possible to only compute a new correction value $P_{corr}$ whenever a deviation with respect to the rated position is above a pre-determined threshold.

Subsequently, a calibration for all colors is performed in block 66, during which a plurality of register marks 3 of the type in accordance with FIG. 2 A is printed. As a result of the completed pre-calibration for the first color it can be ensured that the register line 11 falls on the "reduced" background line 9 in accordance with FIG. 2 A. The positions of the individual colored register lines 7 and 11 are then calibrated in the known manner, and the respective control parameters are set. Subsequently, the process control continues with block 68, in which the determined control parameters are stored and the calibration is completed.

If it has been determined in block 62 that, during the pre-calibration for the first color, the register line 11 was not properly printed on the background line 9, the process control goes to the decision block 70 instead of to the block 64. There, the value i is retrieved in a first step and it is determined whether the value for i is equal to zero. If this is the case—which usually indicates that no iteration has been carried out as of yet—the process control goes on to block 72, in which the correction value for $P_{corr}$ is set equal to zero, and the flag for the iteration cycle is set to active.

If, as previously described, the correction value $P_{corr}$ had already been set to zero during the first pass, it is possible to set the marker for the iteration cycle to active from the start, so that—in this case—block 72 would not be passed. From block 72, the process control then moves again to block 52, where the permanently coded default values for the control parameters of the individual printing units are first set. Inasmuch as, at this time, the correction value $P_{corr}$ is equal to zero, the permanently coded default value is block not changed in block 54. Now, the iteration cycle is recognized as being active in the decision block 56, so that the process control increases the value for i by one via the block 60. Subsequently, a pre-calibration in accordance with block 58 is performed for the first color, and it is determined in block 62 whether the register line 11 has been properly printed on the background line. If this is again not the case, the process control again goes to the decision block 70, where the value for i is again retrieved, said value no longer being zero at this time so that the process control then continues with block 74. In block 74, it is then determined whether the value of i is equal to one. If this is the case, the process control continuous with block 76, where the correction value $P_{corr}$ is set to a value of $+\Delta$, which causes the first register line 7 to be shifted in a first direction by a pre-determined value of, for example, 3 mm.

Thereafter, the process again transfers to block 52, where the permanently coded default values are set. In block 54, the newly set value is now added to the correction value. In block 60, the value of i is increased by one to now two, and in block 58, another pre-calibration is performed. If, subsequently, it is again determined in block 62 that the register line 11 was not properly printed on the background line 9, the process control moves to the decision block 78 via the decision blocks 70 and 74, as is obvious to the person skilled in the art. In block 78, it is determined whether the value of i is equal to two. If this is the case, the process control goes to block 80, where now the correction value $P_{corr}$ is set to $-\Delta$. Subsequently, the process control again goes to block 52, where the permanently coded default values for the control parameters of the printing units are set. In block 54, the newly set cor-reaction value for the first color is added. In block 60, i is again increased by one now to three, and in block 58 a pre-calibration of the first color is again performed. If it was determined again in block 62 that the register line has still not been properly printed on the background line, the process again goes to block 78 via blocks 70 and 74. Inasmuch as the value for i at this time is equal to three, the process control goes from block 78 to block 82, in which the calibration process is interrupted and an error message is issued.

In summary, the iteratively performed calibration leads to several improvements and takes into account important requirements:

1. Even with tolerances greater than ±3 mm, the calibration progresses successfully (currently up to ±6 mm)
2. Machines, which until now were borderline, i.e., in which the calibration worked sometimes, are now reliable.
3. The necessary correction value is determined automatically.
4. The additionally required time—if required at all—is a few minutes at one time. As a rule, this will not even be obvious to the machine operator.
5. Because the correction value is stored in memory, the calibration is started immediately with the optimal correction value during the next start; as a rule, there is no longer any additionally required time.
6. The determination and input of a correction value by the operator of the machine is avoided, this always being fraught with error.
7. The method is stable in view of correction values that have become unusable, because, if an iteration becomes necessary, the correction value is initially reset to zero, and the calibration is begun with a well-defined starting status. This also takes into account the possibility that a service technician inadvertently manually sets an unusable value.

The invention was previously explained in detail with reference to a preferred embodiment of the invention, without, however, being restricted to the specifically illustrated embodiments.

In particular, the above-described calibration can also be used with multi-color printing machines that use a different number of colors. Also, for example, the register line 11 need not consist of CDI but it could be a spot color such as, for example, silver or gold, which, when printed on the transport belt, does not provide a sufficient contrast for a detection by the register sensor 4. In addition, it is also possible to further expand the iteration cycle shown in FIG. 5, in that additional iteration cycles with different values for Δ are performed. In particular, it is conceivable, for example, to provide additional iteration cycles, in which a greater value for Δ is used.

Furthermore, it is possible to expand the process flow shown in FIG. 5 by one calibration routine for the printing density of the first color. Such a routine would have to be arranged, for example, between the decision block 78 and block 82. As part of this routine, it could be determined whether the register line 11 of the first color is printed with sufficient density. In particular, in such a cycle, lines are printed directly on the transport belt 1 and the density of the line is determined with a transmitted-light sensor. If sufficient density exists, the process would subsequently continue with block 82 and stop the calibration, and generate a corresponding error message. If, however, the printing density is not within pre-specified limits, this density can be adjusted accordingly, and then the process would again return to block 50 and again move through the calibration cycle. Inasmuch as a failed detection of the first register line by the register sensor 4 can also be caused by the register line 11 not being printed with sufficient density, such an additional calibration routine regarding the printing density can make the calibration method more stable and errors can be avoided.

The invention claimed is:

1. A method for calibrating a position of a first register line in a register mark for a multi-color printing machine, said first register line consisting of a first color which does not offer sufficient light/dark or dark/light contrasts with respect to a printing material in order to allow a detection above a certain threshold value on a register sensor measuring light/dark and dark/light transitions between the individual register lines and the printing material underneath, said method including the following steps:

a) printing of a plurality of register marks, each consisting of at least one starting line, a background line and a first register line, said background line consisting of a second color which offers sufficient contrast with respect to the first color for a detection above the specified threshold value on the register sensor (4) when the first register line is printed on the background line, said background line, in transport direction seen, having a width that is by X mm greater than the first register line, and said starting line, said background line and said first register line being printed with the use of pre-determined control parameters, which, in the normal case, cause the first register line to be printed on the background line;

b) detecting, whether the first register line has been recognized by the register sensor above the pre-determined threshold value as being completely positioned on the background line;

c) changing of at least one of the pre-determined control parameter for printing the first register line in order to shift the register line +Y mm with respect to the position pre-specified by the pre-determined control parameter in the direction of its width, when the first register line (11) was not recognized above the pre-determined threshold value as being completely positioned on the background line;

d) printing of a plurality of register marks of the above type with the use of at least one changed control parameter for printing the first register line;

e) detecting, whether the first register line has been recognized by the register sensor above the pre-determined threshold value as being completely positioned on the background line;

f) renewed changing of the pre-specified control parameter for printing the first register line in order to shift the line by −Y mm with respect to the position that has been pre-specified by the pre-determined control parameter in the direction of its width, if the first register line is not recognized above the pre-determined threshold value as being completely positioned on the background line;

g) printing of a plurality of first register marks of the above type with the use of the renewed, changed control parameter for printing the first register line;

h) detecting, whether the first register line has been recognized by the register sensor above the pre-determined threshold value as being positioned completely on the background line;

i) generating of a message when the first register line was recognized at no time above the pre-specified threshold value as being completely positioned on the background line;

j) determining the position of the first register line on the background line if said register line was completely detected on the background line, and determining a changed control parameter for the first register line if the first register line, during printing with the pre-determined control parameter, deviates over a pre-specified threshold value from a rated position on the background line; and, k) providing the changed control parameter for subsequent processes.

2. The method in accordance with claim 1, characterized in that the background line is at least 4 mm wider than the first register line.

3. The method in accordance with claim 1, characterized in that the background line is approximately 7 mm wider than the first register line.

4. The method in accordance with claim 1, characterized in that X and Y are real numbers and that the following relationship applies: $Y \leqq X/2$.

5. The method in accordance with claim 4, characterized in that Y is approximately equal to 3 mm.

6. The method in accordance with claim 1, characterized in that the steps c) through i) are repeated at least once with a value for Y that is greater than the previously used value.

7. The method in accordance with claim 1, characterized in that the pre-determined control parameter for printing the register line is a default value that has been pre-specified by the multi-color printing machine.

8. The method in accordance with claims 1, characterized in that the pre-determined control parameter for printing the first register line is a control parameter that has been determined during a previous calibration.

9. The method in accordance with claim 8, characterized in that, between the method steps b) and c), the following steps are introduced:

b1) changing of the pre-determined control parameter for printing the first register line to a default value that has been pre-specified by the multi-color printing machine, said default value being subsequently used as the pre-determined control parameter;

b2) printing of a plurality of register marks of the type mentioned in claim 1, with the use of the changed pre-determined control parameter for printing the first register line; and, b3) detecting whether the first register line was recognized by the register sensor above the pre-determined threshold value as being completely positioned on the background line.

10. The method in accordance with claim 1, characterized in that each of the register marks has, in addition to the starting line, an additional register line which is black and acts as a reference point for a measuring a circumferential register.

* * * * *